United States Patent
Leleu et al.

(10) Patent No.: US 9,449,725 B2
(45) Date of Patent: Sep. 20, 2016

(54) OPTIMISED METHOD FOR LOADING RADIOACTIVE ELEMENTS INTO A PACKAGE

(71) Applicant: TN International, Montigny le Bretonneux (FR)

(72) Inventors: Gilda Leleu, Paris (FR); Hervé Vaudray, Paris (FR)

(73) Assignee: TN INTERNATIONAL, Montigny le Bretonneux (FR)

( * ) Notice: Subject to any disclaimer, the term of this patent is extended or adjusted under 35 U.S.C. 154(b) by 0 days.

(21) Appl. No.: 14/405,966

(22) PCT Filed: Jun. 13, 2013

(86) PCT No.: PCT/EP2013/062275
§ 371 (c)(1),
(2) Date: Dec. 5, 2014

(87) PCT Pub. No.: WO2013/186312
PCT Pub. Date: Dec. 19, 2013

(65) Prior Publication Data
US 2015/0155064 A1    Jun. 4, 2015

(30) Foreign Application Priority Data
Jun. 15, 2012 (FR) .................................... 12 55601

(51) Int. Cl.
| G21C 19/32 | (2006.01) |
| G21C 19/07 | (2006.01) |
| G21F 5/008 | (2006.01) |
| G21F 5/14  | (2006.01) |
| G21C 19/19 | (2006.01) |

(52) U.S. Cl.
CPC ................. *G21F 5/14* (2013.01); *G21C 19/19* (2013.01); *G21C 19/32* (2013.01); *G21F 5/008* (2013.01); *G21C 19/07* (2013.01)

(58) Field of Classification Search
CPC ........... G21F 5/00; G21F 5/005; G21F 5/008
See application file for complete search history.

(56) References Cited

U.S. PATENT DOCUMENTS

| 4,366,095 A | 12/1982 | Takats |
| 5,661,768 A | 8/1997 | Gilligan, III |

(Continued)

FOREIGN PATENT DOCUMENTS

FR    2 465 298 A    12/1982

OTHER PUBLICATIONS

U.S. Appl. No. 14/409,183, "Packaging for Transporting and/or Storing Radioactive Material", filed Dec. 18, 2014.

(Continued)

*Primary Examiner* — Nicole Ippolito
*Assistant Examiner* — Sean Luck
(74) *Attorney, Agent, or Firm* — Pearne & Gordon LLP

(57) ABSTRACT

The invention relates to a method of loading radioactive elements (8) in a package comprising the following steps:
(a) placement of a plurality of radioactive elements (8) in a storage basket (30) provided with radiological protection means (32), in the pool;
(b) extraction of the basket (30) containing the radioactive elements (8) out of the pool; and
(c) loading said basket (30) containing the radioactive elements (8), into the package.

12 Claims, 7 Drawing Sheets

(56) References Cited

U.S. PATENT DOCUMENTS

| | | | |
|---|---|---|---|
| 7,590,213 B1* | 9/2009 | Singh | G21F 5/00 250/506.1 |
| 8,098,790 B2* | 1/2012 | Singh | G21C 19/06 250/506.1 |
| 2005/0207525 A1* | 9/2005 | Singh | G21F 5/00 376/272 |
| 2012/0083644 A1* | 4/2012 | Singh | G21C 19/06 588/17 |

OTHER PUBLICATIONS

Search Report issued in corresponding French Patent Application No. FR 12 55601 dated Jan. 21, 2013.
International Preliminary Report on Patentability issued in Application No. PCT/EP2013/062275 dated Jun. 16, 2014.
International Search Report issued in Application No. PCT/EP2013/062275 dated Aug. 23, 2013.
Written Opinion issued in Application No. PCT/EP2013/062275 dated Aug. 23, 2013.

* cited by examiner

OPTIMISED METHOD FOR LOADING RADIOACTIVE ELEMENTS INTO A PACKAGE

TECHNICAL FIELD

The invention relates to the field of loading radioactive elements into a package. It particularly concerns loading of radioactive elements located in a pool, into a package under a gaseous atmosphere, preferably ambient air.

The invention is preferably applicable to loading radioactive elements such as worn rod cluster control guides, also known as "RCC guides", in a nuclear reactor, but it can also be applied to any other radioactive elements as such irradiated fuel assemblies.

STATE OF PRIOR ART

RCC guides in a nuclear reactor have to be replaced when they are worn. To achieve this, there are firstly taken out of the reactor and placed close to the reactor vessel, without being taken out of the pool. These RCC guides are then extracted from the pool from the Upper Internals (UI), and then transferred directly and individually through a transfer hood to a transport and/or interim storage container located in ambient air.

To achieve this, the transfer hood open at its two opposite ends is placed flush with the surface of the pool above a RCC guide. The RCC guide is then extracted from the pool and is inserted in the transfer hood using a handling system connected to the RCC guide. After this operation, the RCC guide is surrounded by this hood that forms a radiological protection. The assembly obtained is then moved above the container including a package containing a RCC guide storage basket. While the hood is held in place above the container, the RCC guide is moved downwards to bring it into one of the basket housings.

This sequence of operations is thus repeated once for each RCC guide to be placed in the container, there are usually between ten and twenty.

Therefore this solution is not entirely optimised because it does not enable fast operation due to the large number of operations to be carried out to completely load all RCC guides in the container. Furthermore, even if the function of the transfer hood is to provide operators with radiological protection as each RCC guide passes between the pool and the container, there is still significant exposure to radiation.

Similar disadvantages are observed regardless of the nature of the radioactive elements to be loaded, once they have been taken out of their pool to be inserted in a package under a gaseous atmosphere, usually ambient air.

PRESENTATION OF THE INVENTION

Therefore the purpose of the invention is to at least partially overcome the disadvantages mentioned above related to embodiments according to prior art.

To achieve this, the purpose of the invention is a method of loading radioactive elements in a package comprising the successive following steps:

(a) placement of a plurality of radioactive elements in a storage basket provided with radiological protection means, in the pool;

(b) extraction of the basket containing the radioactive elements out of the pool; and (c) loading said basket containing the radioactive elements in the package.

The invention thus deviates from standard practice in which the radioactive elements under water are transferred one by one into a dry package. This is made possible by the use of a radiological shielding basket that contains several radioactive elements when the radioactive elements are still under water, this basket then being taken out of the pool to be placed in the package ready for interim storage and/or transport of these radioactive elements.

Conventionally, "basket" refers to an open structure that is absolutely not configured to confine the radioactive elements placed in it. On the contrary, the basket is configured to allow water to flow out of it as it is extracted from the pool. Therefore, the basket preferably has no closing system, since radioactive elements are confined solely by the package.

Since the basket is used to transfer radioactive elements between the pool and the package, there is no longer any need for the transfer hood as in prior art. This thus reduces the cost of implementing the loading method. These costs also optimise the work time that is shorter because several radioactive elements are loaded simultaneously in the package, but also there is no longer any need to dock the hood on the package. This reduction in application time also reduces the exposure time of operators to radiation.

Preferably, each radioactive element is held in place by gravity in its storage basket. This design facilitates the step to load radioactive elements from the pool into the basket.

Preferably, each basket has a plurality of housings inside each of which one of the radioactive elements is placed.

Preferably, steps (a) to (c) are repeated several times such that several baskets are loaded in said package. The fact that several baskets are provided can reduce the size of the baskets, and particularly provides a satisfactory solution to operating constraints related to the small available volume in the pool to accommodate the baskets.

The baskets housed in the package then preferably define an external lateral surface that is a approximately complementary to the lateral surface of a cavity of the package in which they are housed. Thus, once the baskets are placed in the cavity, they are perfectly held in position in this cavity due to the complementary shape of the external lateral surface of the baskets and the lateral surface of the cavity. This special feature may be adopted when a single basket will be housed in the cavity of the package, regardless of the shape of this cavity, to which the external lateral surface of the basket(s) may be adapted.

Preferably, radiological protection means are also provided with the package. Therefore they are additional to the protection means provided with the storage basket. Naturally, the radiological protection means fitted on the basket and the package are configured to satisfy regulatory transport and/or interim storage criteria for radioactive elements.

Preferably, the package is closed by a lid after said basket containing the radioactive elements has been loaded in the package cavity. Therefore this basket is intended to remain permanently in the package throughout transport and/or interim storage of the radioactive elements, so as to form a container with it.

Preferably, each storage basket houses between five and ten radioactive elements. Thus, when it is intended that two baskets will be housed in the same package cavity, the package will be configured to contain between ten and twenty radioactive elements.

Preferably said radioactive elements are worn RCC guides or irradiated fuel assemblies. Other types of radioactive elements may be concerned, without going outside the scope of the invention.

Finally, another purpose of the invention is a method of transport and/or interim storage of radioactive elements including implementation of the loading method disclosed above before said transport and/or interim storage. This transport on the public highway and/or interim storage on site consequently takes place with the shielded basket containing radioactive elements housed in the package provided for it.

Other characteristics and advantages of the invention will become clear in the non-limitative detailed description given below.

BRIEF DESCRIPTION OF THE DRAWINGS

This description will be made with reference to the appended drawings among which.

DETAILED PRESENTATION OF PREFERRED EMBODIMENTS

Figure 1:
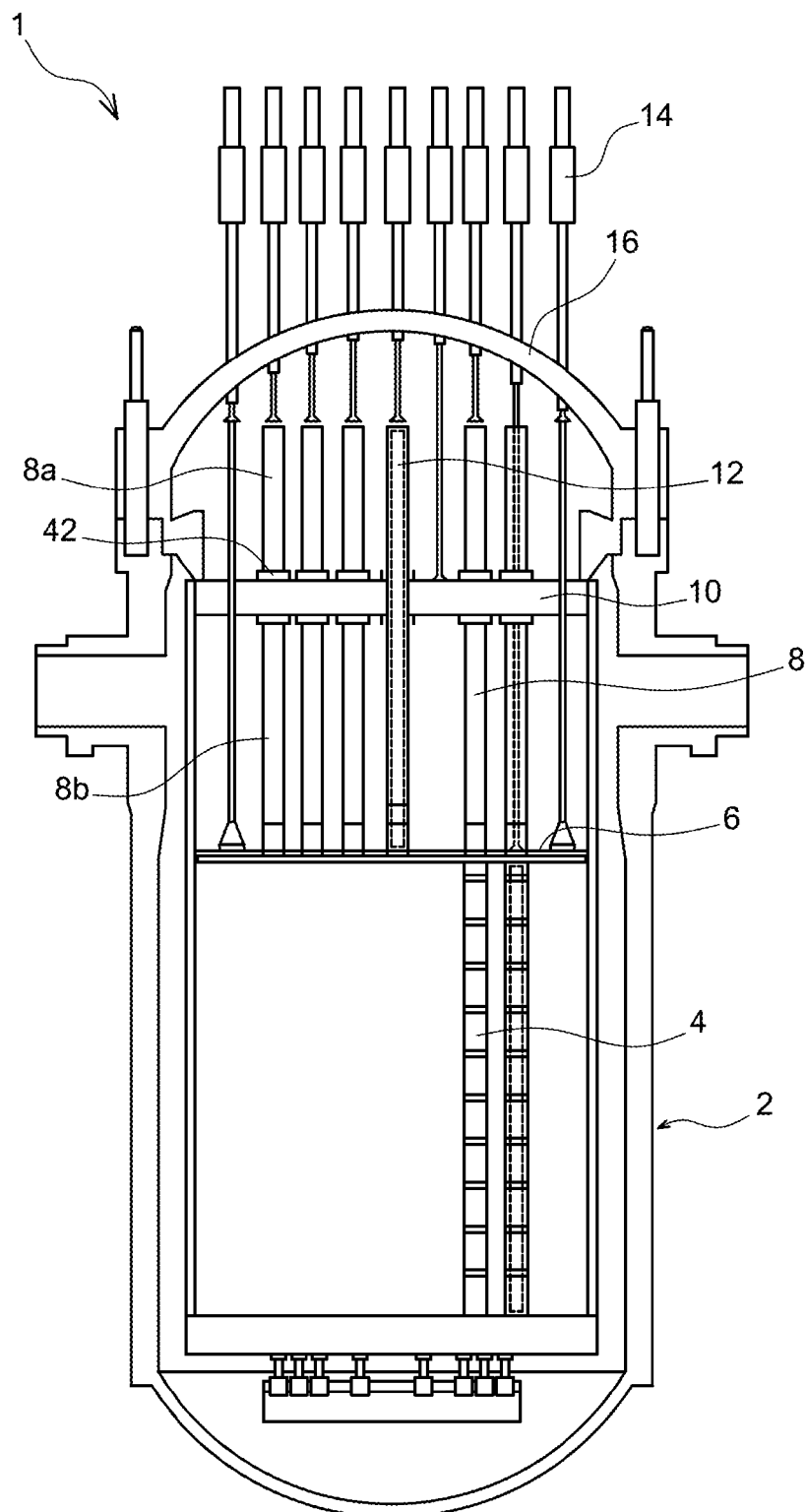
FIG. 1 shows a sectional view of a part of a nuclear reactor.

Firstly with reference to FIG. 1, the figure shows a nuclear reactor 1 of the pressurised water type, according to a classical configuration that will be briefly described below.

The reactor comprises a vessel 2 at the bottom of which nuclear fuel assemblies 4 are placed forming the reactor core. An upper core plate 6 covers the assemblies 4 and separates them from a series of RCC guides 8 each aligned with a fuel assembly 4. The guides 8, usually in the form of a sheath, have a two-part design, namely there is an upper part 8a and a lower part 8b connected to each other by a flange 42. The RCC guides are fixed by this flange 42 to an RCC guide support plate 10 to form a set of Upper Internals (UI). Finally, a control RCC 12 is associated with each RCC guide and is controlled by a control mechanism 14 in the part above the lid 16 of the vessel.

The control RCCs 12 are used to control the reactor 1. They are formed by several rods or bars manufactured with neutron absorbing metals, and are housed free to slide in the RCC guides 8. The chain reaction in the reactor produces a surplus of neutrons, while the RCCs adjust the power. If an incident occurs, they are capable of very quickly stopping the nuclear reaction by dropping under the action of gravity along the fuel rod assemblies 4, by sliding through their RCC guides 8.

Due to their position above the assemblies 4 in the reactor, the lower part of the RCC guides 8 is highly activated during operation of the reactor. Consequently, this part has a high level of gamma radiation.

In the remainder of the description, we will disclose a preferred embodiment of the method according to the invention aiming at loading the RCC guides 8 in a package. This method is used when the guides 8 are worn and they have to be replaced by new RCC guides.

Firstly, it has to be noted that the entire UI has been previously extracted from the reactor and placed in a working pool adjacent to the vessel. The guides 8 are then separated from the support plate 10 (shown in FIG. 1), and are then placed in one or several storage baskets 30 specific to this invention. These baskets may firstly be used as storage devices for new RCC guides that will replace the worn guides in the reactor. Thus, new guides are interchanged with the worn guides 8 as the worn guides are transferred to the baskets 30.

Each storage basket has radiological means of protection essentially against gamma radiation. In this case, these means are in the form of a thick sidewall 32 made of steel or a similar material, that will cover the activated lower part of the RCC guides. In this solution with two baskets 30, each of the two walls 32 has a semi-circular cross-section.

Figure 2:
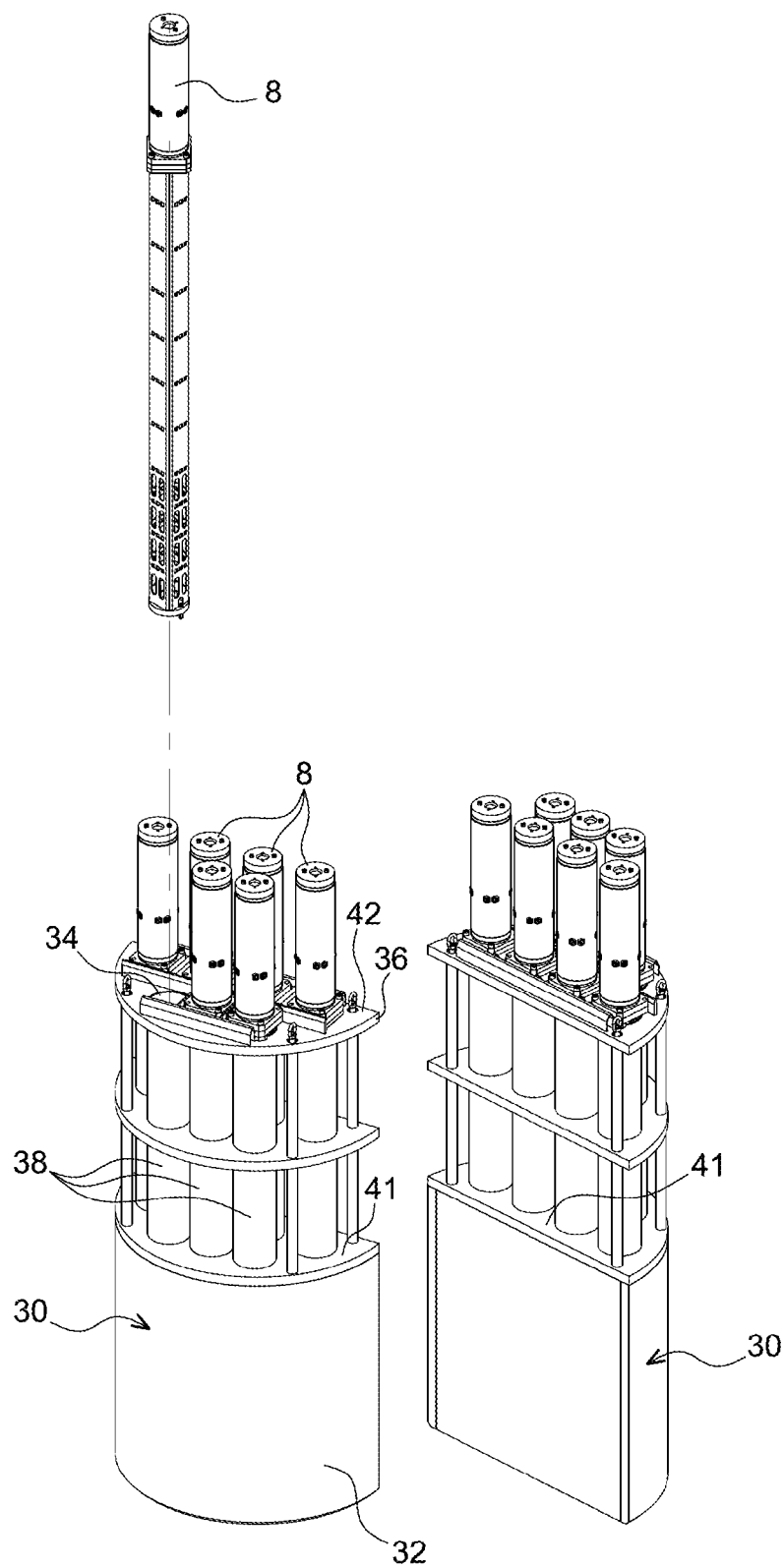
FIG. 2 shows a first step in a preferred embodiment of the method according to the invention intended to install RCC guides in two shielded storage baskets, in the pool.
Figure 3:
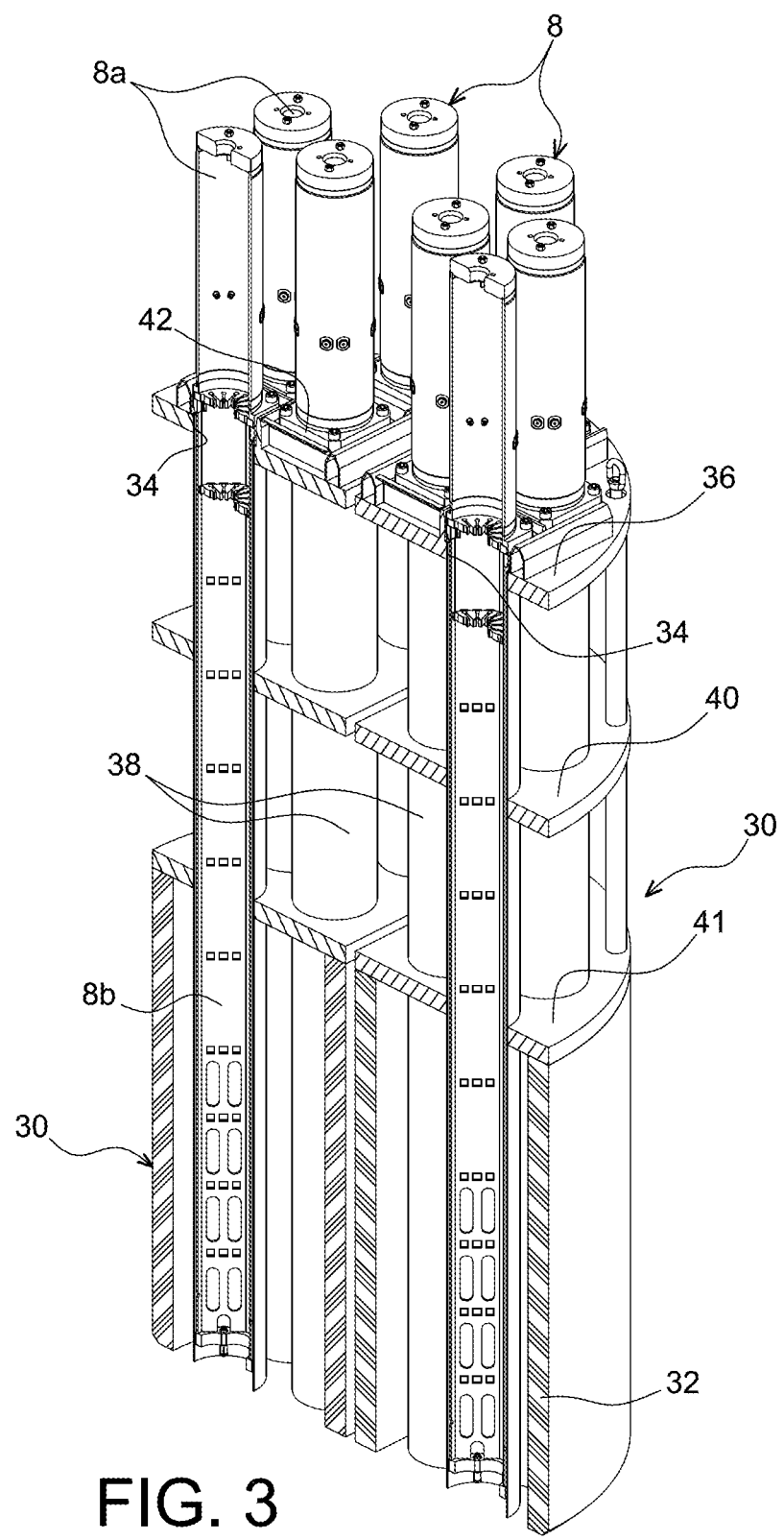
FIG. 3 shows a detailed perspective view of storage baskets in the previous figure, containing RCC guides.

Each basket 30 defines a plurality of housings 34 in each of which an RCC guide 8 will be housed as can be seen in FIG. 2. It has a head plate 36 on which all housings 34 open, this plate also participating in holding the sheaths 38 which define the housings in place and which extend over practically the entire height of the basket. As mentioned above, the shielding sidewall 32 in the lower part of the basket 30 surrounds the sheaths 38 as can be seen in the two near baskets in FIG. 3. There will be one or several intermediate plates 40 on these baskets 30 holding the sheaths 38, and a plate 41 closing the sensitive zone assembled on the top end of the thick wall 32. This plate 41, through which the sheaths 38 also pass, also provides radiological protection against gamma radiation.

Therefore, the worn RCC guides 8 are placed one by one in the shielded baskets 30, while being still under water. Conventional handling means are used to achieve this, to extract each guide from the rack 20 and then to place it in one of the housings 34 of the baskets. In this regard, each basket disclosed has seven housings 34 to accommodate seven worn RCC guides 8.

Once each guide 8 has been placed in its basket housing 34, it will only have its lower part 8b embedded in the basket, and its upper part 8a that is inactive will remain projecting upwards beyond the head plate 36. It has to be noted that the mechanical junction 42 between the lower part and the upper part of each guide can act as a stop against this head plate 36, so that the guide remains in the basket by gravity. Alternately, the bottom end of the guide could bear in contact with a bottom plate in the basket, not shown in the embodiments in FIGS. 2 and 3. In this case, one or several openings will be formed in the bottom so that the container can be drained and then dried.

It has to be noted also that the shielding sidewall 32 does not extend over the entire height of the lower part 8a of the RCC guides, but only over the most active lower part.

Once one of the baskets 30 contains the seven RCC guides 8, the basket will be extracted from the pool still using conventional handling means, and will then be inserted in the cavity 44 of a package 50. To achieve this, the sheaths 38 of the baskets 30 are configured to allow water to escape during extraction from the pool and to prevent any harmful water retention zone when drying the package cavity after loading. When the basket is extracted from the pool, this basket containing the RCC guides is not surrounded by any elements. In particular, it is fitted with its own radiological protection means, and therefore does not have to be placed in a package or a similar material to be extracted from the pool.

The package 50 shown in FIGS. 4A to 7 has a conventional design, namely it comprises a bottom 52, a side body 54 and a lid 56, its opposite ends possibly being provided with shock absorbing covers 58. The side body 54 also provides radiological protection against gamma radiation due to the large thickness of the material at the relevant locations, this material preferably being steel.

Figure 4A:
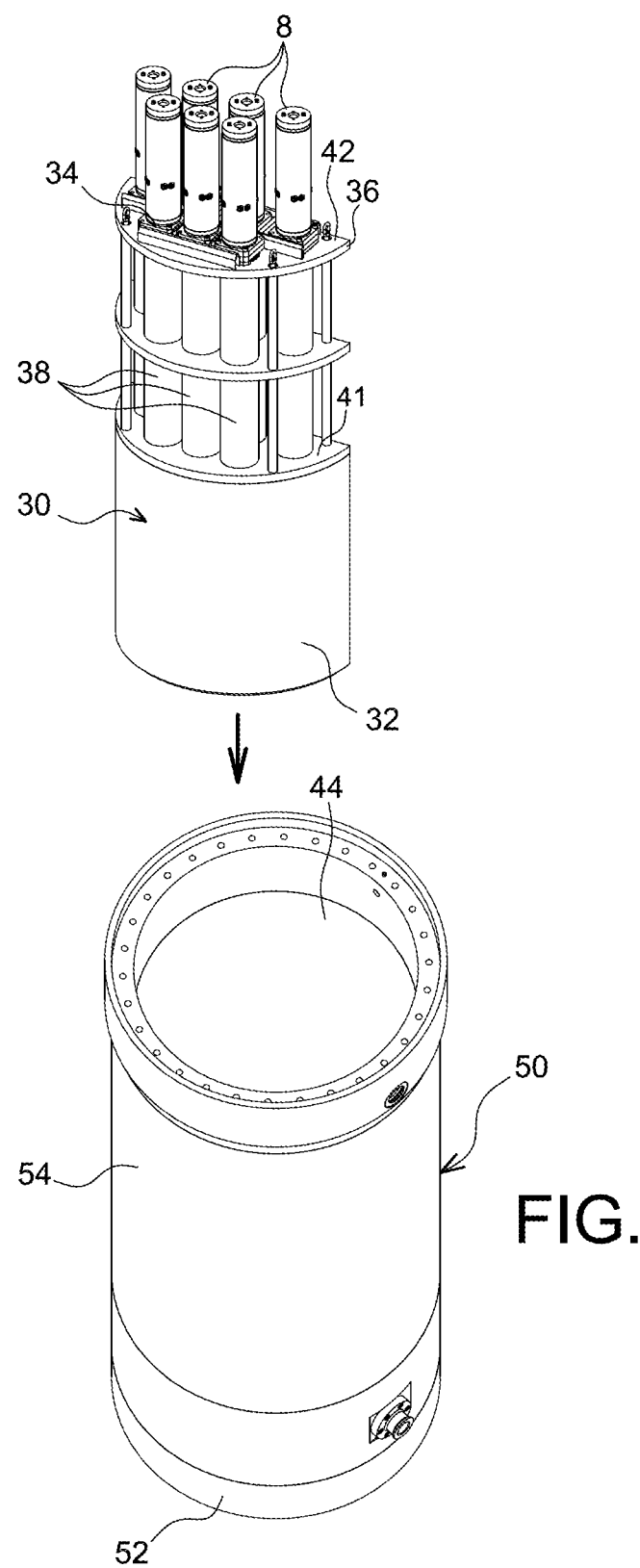
FIGS. 4A to 5 show a subsequent step in the method configured to load the storage baskets in a package.
Figure 4B:
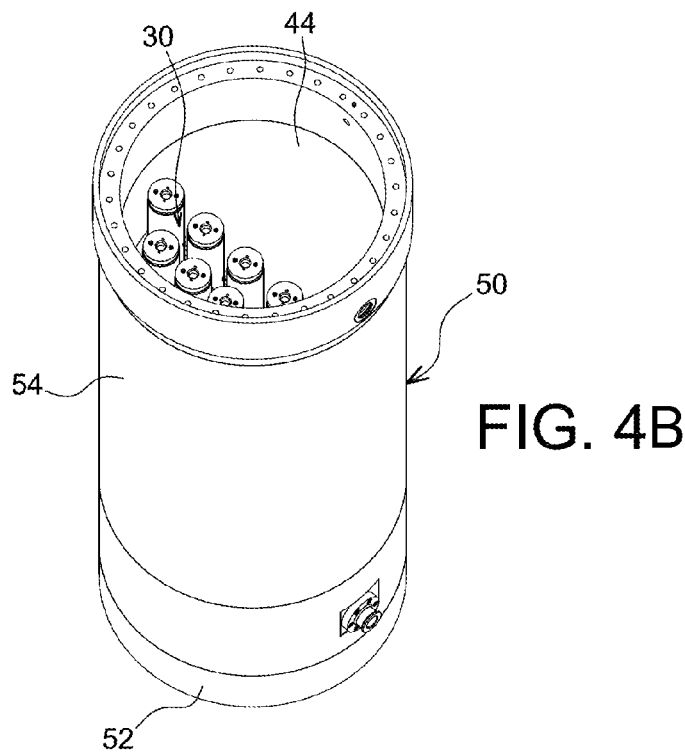
Figure 5:
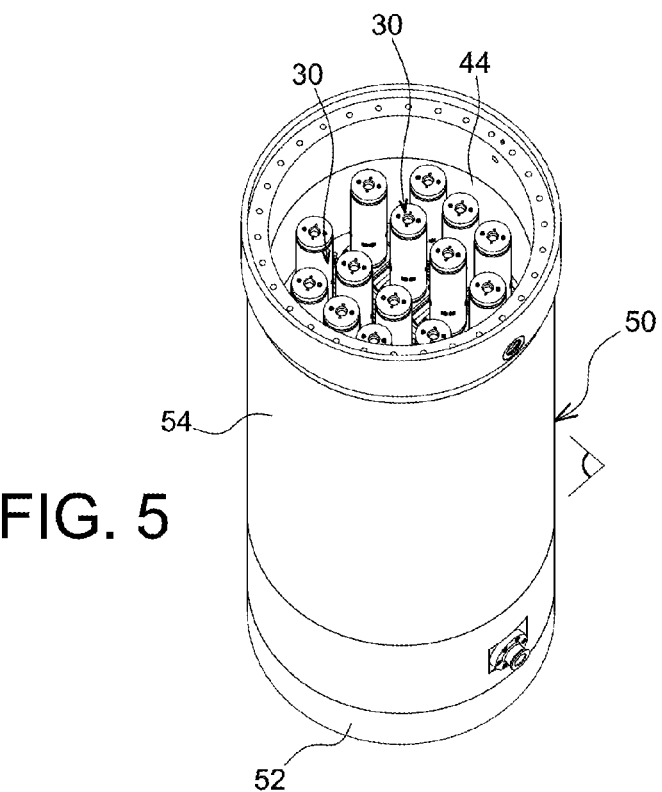

Therefore, the package 50 defines the cavity 44 inside which the two loaded baskets 30 will be housed, and then kept for subsequent transport operations on the public highway and/or for interim storage on site. The cavity 44 is then configured to confine the radioactive elements contained in it, the basket not contributing to performing this function. FIG. 4A shows loading of the first basket 30 that is preferably done vertically from the upper opening in the side body 54. FIG. 4B shows the package with the first basket 30 loaded in the cavity 44, while FIG. 5 shows the same package after the second basket 30 has been loaded, also preferably vertically. Once these baskets 30 have been loaded in the cavity 44, they are held on the bottom 52 of the package by the force of gravity.

Figure 6:
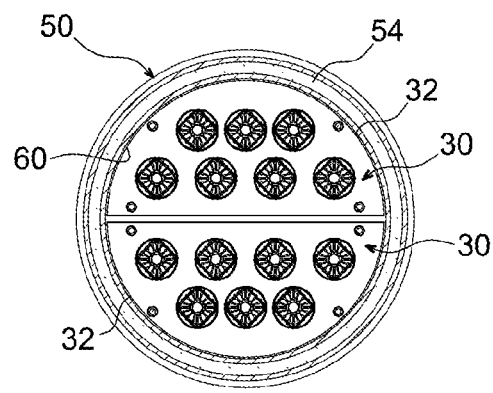
FIG. 6 shows a cross-sectional view taken along plane P in FIG. 5.

As shown diagrammatically in FIG. 6, once the baskets 30 are in position in the package, the two walls 32 together define a lateral external surface with a circular cross-section approximately complementary to the lateral surface 60 of the cavity 44 of the package. This allows the baskets 30 to be held in position in this same cavity, simply by the complementary shapes.

Figure 7:
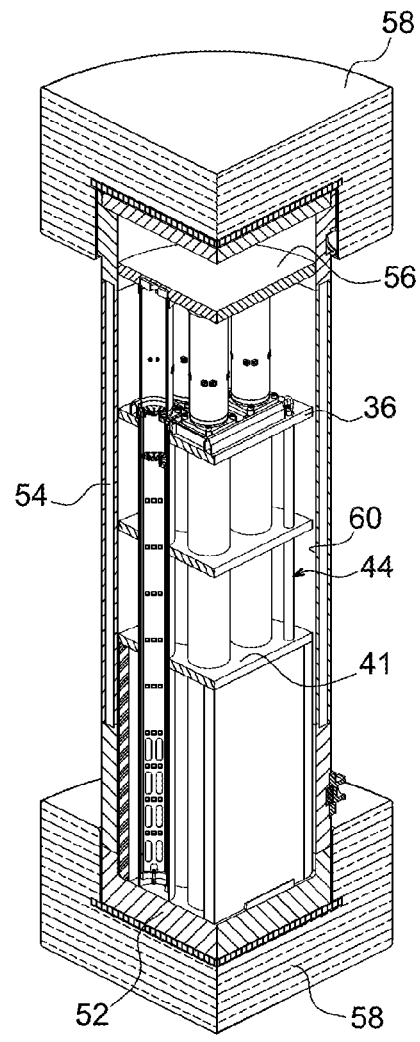
FIG. 7 shows a perspective view of a quarter of a container formed by the package and storage baskets contained in it.

The cavity 44 is then closed by the package lid 56 as shown in FIG. 7, thus enclosing the baskets 30 loaded inside this cavity, so that the worn guides 8 can then be transported and/or stored, using this container formed by the package 50 and the baskets 30.

Figure 8:
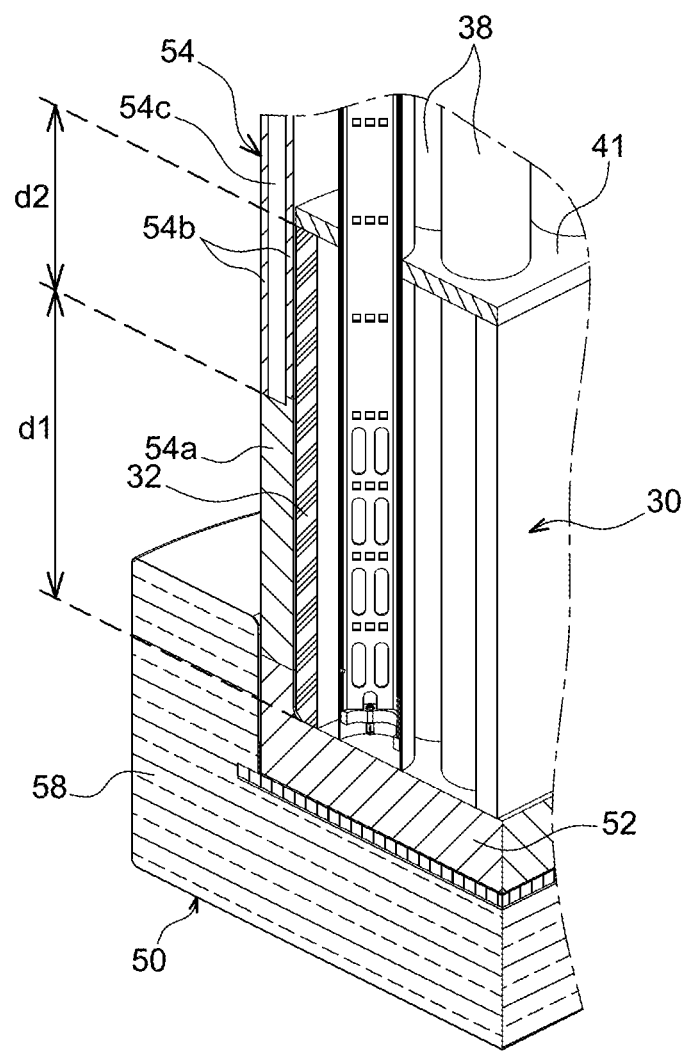
FIG. 8 is an enlarged view of part of the view in FIG. 7, in which dimensions have been added.

FIG. 8 shows the lower part of this container comprising the radiological protection means provided on the package 50 and the baskets 30.

Starting from the bottom 52 of the package over a height d1, the thick sidewall 32 of the baskets and the solid lower part 54a of the side body 54 are radially superposed providing maximum radiological protection surrounding the active lower part of the RCC guides. This height may be of the order of 1100 mm for a global shielding thickness of the order of 215 mm, composed of 85 mm originating from the wall 32 and 130 mm originating from the solid lower part 54a of the lateral body 54. The container then is prolonged over a height d2 in which the thickness of the sidewall 32 of the baskets is maintained, but only two concentric shells 54b form the shielding of the lateral body 54. For example, each of these two shells 54b may be of the order of 30 mm thick, and the annular space between the shells is possibly filled with a foam 54c. This configuration with two concentric shells is maintained as far as close to the top end of the package, while the walls 32 stop at the level of the plate 41.

Obviously, those skilled in the art could make various modifications to the invention disclosed above solely as non-limitative examples.

What is claimed is:

1. Method for loading radioactive elements in a package, comprising the successive following steps in this order:
   (a) placing a plurality of radioactive elements in a storage basket in a pool containing water, wherein the storage basket comprises at least one element chosen among a shielding sidewall, a sheath or a plate, for radiological protection;
   (b) after said step (a), extracting the basket containing the radioactive elements out of the pool, wherein the basket is configured such that a majority of the water in the basket is removed as the basket is extracted out of the pool; and
   (c) after said step (b), loading said basket containing the radioactive elements in the package.

2. Method according to claim 1, wherein each of the radioactive elements is held in place by gravity in the storage basket.

3. Method according to claim 1, wherein steps (a) to (c) are repeated several times such that several baskets are loaded in said package.

4. Method according to claim 3, wherein the baskets housed in the package together define an external lateral surface that is approximately complementary to the lateral surface of a cavity of the package in which the baskets are housed.

5. Method according to claim 1, wherein the package comprises at least one element chosen among a solid lower part or two concentric shells, for radiological protection.

6. Method according to claim 1, wherein the package is closed by a lid after said basket containing the radioactive elements has been loaded in the package cavity.

7. Method according to claim 1, wherein each storage basket houses between five and ten radioactive elements.

8. Method according to claim 1, wherein said radioactive elements are worn rod cluster control guides or irradiated fuel assemblies.

9. Method of transport of radioactive elements including successive following steps in this order:
   (a) placing a plurality of radioactive elements in a storage basket provided with radiological protection means, in a pool containing water;
   (b) after said step (a), extracting the basket containing the radioactive elements out of the pool, wherein said basket is configured such that a majority of the water in the basket is removed as the basket is extracted from the pool;
   (c) after said step (b), loading said basket containing the radioactive elements in a package; and
   (d) after said step (c), transporting the package comprising the basket.

10. Method of interim storage of radioactive elements including the successive following steps in this order:
    (a) placing a plurality of radioactive elements in a storage basket provided with radiological protection means, in a pool containing water;
    (b) after said step (a), extracting the basket containing the radioactive elements out of the pool, wherein said basket is configured such that a majority of the water in the basket is removed as the basket is extracted from the pool;
    (c) after said step (b), loading said basket containing the radioactive elements in a package; and
    (d) after said step (c), stocking the package comprising the basket during interim storage.

11. Method according to claim 1, wherein the storage basket is made of a material that provides radiological protection to an area surrounding the storage basket.

12. Method according to claim 1, wherein said step (c) of loading said storage basket containing the radioactive elements in the package occurs outside of the pool.

* * * * *